3,636,178
PROCESS FOR THE PRODUCTION OF NAPHTHALENE FROM HOMOLOGS OF INDENE, BY PYROLYTIC RING EXTENSION
Heinz-Gerhard Franck and Rudolf Oberkobusch, Duisburg-Meiderich, Johannes Turowski, Castrop-Rauxel, Gerd Collin, Duisburg-Meiderich, Maximilian Zander, Recep Kemalettin Erunlu, Gunter Storch, and Herbert Buffleb, Castrop-Rauxel, and Hans-Dieter Sauerland, Duisburg, Germany, assignors to Rutgerswerke Aktiengesellschaft, Frankfurt am Main, Germany
No Drawing. Filed Nov. 4, 1969, Ser. No. 874,042
Claims priority, application Germany, Nov. 7, 1968, P 18 07 502.0-42
Int. Cl. C07c 5/26
U.S. Cl. 260—668 F
12 Claims

ABSTRACT OF THE DISCLOSURE

Naphthalene is produced by pyrolytic treatment of indene homologs by passing indene homologs, if desired in mixture with naphthalene and other hydrocarbons, at temperatures in the range of 550 to 800° C. through a pyrolysis zone, separating from the resulting pyrolysis products a condensable naphthalene-containing fraction by distillation and recovering naphthalene from said fraction in conventional manner by cooling, crystallization and centrifuging.

---

Naphthalene is needed in increasing amounts in the production of phthalic acid, intermediates of dyes and pesticides. Therefore, in connection with widening the basis of raw materials for the production of naphthalene which has been hitherto recovered by large-scale processes from coal tar by distillation and crystallization or by hydrodealkylation of aromatic oil fractions containing alkylnaphthalenes, inexpensive synthetic processes are of considerable interest.

In the synthetic process according to the present invention indene homologs are used as starting materials. Indene homologs, particularly mono- and dimethylindenes, accompany boiling naphthalene in oil fractions rich in aromatic substances. It has now been found that in the pyrolysis of these indene homologs at temperatures between 550 and 800° C., ring extension to naphthalene takes place.

In carrying out the present invention, indene homologs alone or a mixture of indene homologs with naphthalene and other hydrocarbons, are passed at temperatures in the range of 550 to 800° C., preferably in the range of 600 to 750° C., through a pyrolysis zone; from the condensable pyrolysis products by distillation a naphthalene fraction is separated and from the latter naphthalene is recovered in a manner known by itself, by crystallization.

Said pyrolytic treatment is preferably carried out without pressure in the gaseous phase, in the presence or absence of catalysts. As catalysts, hydrogenation catalysts or dehydrogenation catalysts, known from the art, can be used, for example, tin applied to clay shard, nickel or zinc oxide-chromium oxide and the like are used. The material to be treated can be passed in the presence or absence of a carrier gas through the pyrolysis zone.

As a material to be treated by pyrolysis preferably an oil fraction is used, which contains an indene homolog, and, if desired, naphthalene, is rich in aromatic compounds and has a boiling range of 180 to 250° C., preferably 205 to 235° C.

In the ring extension according to the invention, the following compounds are formed as by-products in the treatment of methylindenes: Indene is formed by dealkylation, chrysene by condensation from indene, methylnaphthalene by transalkylation and gaseous and liquid compounds, all of which can be easily separated by distillation from naphthalene in contrast to methylindenes. Therefore, after being processed by distillation of the condensable pyrolysis products, naphthalene can be recovered from the resulting naphthalene fraction, in conventional manner economically. At the same time, the recovery of naphthalene already present in the oil fraction used as starting material rich in aromatics, but—due to the good dissolving power of the indene homologs—not crystallizable, or only to a small portion, at normal temperature, can be considerably improved. In other words, in the process of the present invention naphthalene is not only newly formed, but the recovery of naphthalene already present in such oil fractions is essentially improved by the removal of disturbing ingredients.

In analogy to monomethylindenes, by pyrolytic ring extension of dimethylindenes primarily 1- and 2-methylnaphthalene are formed. Due to dealkylation which takes place parallel with ring extension, a part of the naphthalene homologs is converted into naphthalene.

Likewise, from a part of the dimethylindenes, monomethylindene and indene are formed. Thus, hereby too, the ingredients adversely affecting the recovery of naphthalene, are either converted into easily removable compounds or into naphthalene proper, so that the recovery of naphthalene from oil fractions which in addition to naphthalene contain also homologs of indene, is improved by a twofold effect. As the result of the present process, naphthalene yields up to about 40% based on the indene homologs present in the respective starting materials are obtained.

EXAMPLE 1

80 mg. of 3-methylindene are passed in a nitrogen current with a time of stay of about 5 seconds through a quartz tube containing quartz wool and heated to 750° C. The pyrolysis vapors are taken up by small absorption tubes. 60 mg. (75%) absorbed pyrolysis product, 6 mg. (7%) of carbon (coke) and 14 mg. (18%) gaseous compounds are thus obtained.

Analysis of the pyrolysis product gave the following results (the figures in parenthesis indicate yields based on the 3-methylindene charged):

| | | |
|---|---|---|
| Naphthalene | 52% | (39%) |
| Indene | 13% | (10%) |
| Methylnaphthalene | 3% | (2%) |
| Chrysene | 8% | (6%) |
| Other compounds | 24% | (18%) |

EXAMPLE 2

3266 g. of an oil fraction rich in aromatic compounds, having a boiling range of 205 to 225° C., containing 27.8% (908 g.) of naphthalene and 20.3% (663 g.) of methylindenes, are passed during a period of 6½ hours through a pyrolysis tube of V4–A steel having a length of 1 meter, an interior diameter of 5 cm. and being kept at 600–630° C. Said pyrolysis tube is filled with coarse clay shard coated with 3% of tin. Thereby 2757 g. (85%) condensable pyrolysis product and 410 l. of pyrolysis gas are formed. According to analysis, the pyrolysis condensate contained 1017 g. of naphthalene, so that 109 g. of naphthalene were newly formed by pyrolysis. By distillation 1287 g. of a naphthalene fraction were obtained, from which 888 g. of crystalline naphthalene were obtained by cooling to 20° C. and centrifuging.

EXAMPLE 3

1379 g. of an oil fraction rich in aromatic compounds, having a boiling range of 205 to 225° C. and containing 28.4% (389 g.) of naphthalene, and 21.0 g. (288 g.) methylindenes are passed within 40 minutes through an empty V4A steel tube, having a length of 1 meter and an interior diameter of 5 cm., heated to 650 to 680° C. 1220 g. (89%) of condensable pyrolysis product and 140 liter pyrolysis gas are thereby formed. By distillation, the pyrolysis condensate yields 573 g. of a naphthalene fraction, from which 378 g. of crystalline naphthalene were obtained by cooling to 20° C. and centrifuging. By analysis of the processed products, the following naphthalene balance was obtained:

| | G. |
|---|---|
| Naphthalene in the centrifuged material | 363 |
| Naphthalene in the centrifuged oil filtrate | 58 |
| Naphthalene in the first runnings of distillation | 19 |
| Naphthalene in the last runnings of distillation | 22 |
| Total of the naphthalene in the pyrolysis products | 462 |
| Naphthalene in the charged product | 389 |
| Newly formed naphthalene | 73 |

EXAMPLE 4

4000 g. of an oil fraction rich in aromatic compounds, having a boiling range of 205 to 225° C., a naphthalene content of 32.0% (1280 g.) and containing methylindenes of 20.3% (812 g.) were subjected to pyrolysis in a manner analogous to that described in the above Example 3. Thereby, 3530 g. of condensable pyrolysis product (88%) having a naphthalene content of 42.2% (1490 g.) were formed. Processing was carried out in the manner described in the above Example 3, by distillation, cooling and centrifuging and yielded 1,185 g. of centrifuged naphthalene having a naphthalene content of 96.7%, corresponding to a naphthalene yield of 93%, based on the naphthalene present in the starting oil fraction, prior to pyrolysis. Without pyrolysis, from 4000 g. of the same starting oil fraction, by similar distillation, cooling and filtering, only 531 g. of centrifuged naphthalene-containing material were obtained. This corresponds to a naphthalene content of 96.4% in the centrifuged product to a naphthalene yield of 40%, based on the amount of naphthalene present in the starting oil fraction. Thus, by application of said pyrolysis, the comparable naphthalene yield was increased by 132%.

EXAMPLE 5

1000 g. of an oil fraction rich in aromatic compounds, having a boiling range of 220 to 235° C., a naphthalene content of 2.6% (26 g.), a content of 80.0% (800 g.) of dimethylindenes, a content of 7.1% (71 g.) of 2-methylnaphthalene and a content of 0.7% (7 g. of 1-methylnaphthalene, are passed through an empty V4A steel tube of a length of 1 m. and 5 cm. of interior diameter, heated to 700° C. during a period of 40 hours. Thereby 700 g. (70%) of condensable pyrolysis products of the following composition are formed:

| | | |
|---|---|---|
| Compounds boiling below 200° C. | 26.0% | (182 g.) |
| Methylindene | 7.6% | (53 g.) |
| Naphthalene | 12.0% | (84 g.) |
| Dimethylindene | — | (—) |
| 2-methylnaphthalene | 16.9% | (119 g.) |
| 1-methylnaphthalene | 5.2% | (36 g.) |

Thus, by ring extension, from the dimethylindenes, 58 g. of naphthalene and 77 g. of methylnaphthalene have been newly formed.

It will be understood that the present invention is not limited to the specific steps, proportions and other conditions described above and can be carried out with various modifications.

As catalyst, any hydrogenation catalyst or dehydrogenation catalyst can be used, for example tin applied to clay shard, nickel or zinc oxide-chromium oxide and the like are used.

As carrier gas, in addition to nitrogen, any other gas which is inert uner the conditions of pyrolysis, e.g. water (gas), carbon dioxide, helium, can be used. The boiling ranges and the term "without compression" stated herein, refer to ordinary atmospheric pressure. The term "V4A steel" used herein refers to stainless steel, containing (percent w./w) Fe 65, Cr 18, Ni 12, Mo 2, Mn 2, Si 1, C 0.1. The term "oil fraction rich in aromatic compounds" is used herein to denote oil fractions which contain mainly hydrocarbons, particularly petroleum oil fractions from cracking processes or coal tar oil fractions, e.g. oil fractions with a boiling range of 180 to 250° C.

What is claimed is:

1. A process for producing naphthalene by pyrolytic ring extension from indene homologs, comprising passing indene homologs at temperatures in the range of 550 to 800° C. through a pyrolysis zone, separating from the resulting pyrolysis products a condensable naphthalene-containing fraction by distillation, and recovering naphthalene from said fraction by cooling and crystallization.

2. A process for producing naphthalene by pyrolytic ring extension from a mixture of indene homologs with hydrocarbons including naphthalene, comprising passing vapors of said mixture at temperatures in the range of 550 to 800° C. through a pyrolysis zone, separating from the resulting pyrolysis product a condensable naphthalene-containing fraction by distillation, and recovering naphthalene from said fraction by cooling and crystallization.

3. A process as claimed in claim 1, in which pyrolysis is carried out at temperatures in the range of 600–750° C.

4. A process as claimed in claim 2, in which pyrolysis is carried out at temperatures in the range of 600–750° C.

5. A process as claimed in claim 1, in which pyrolysis is carried out without compression in gaseous phase, in the absence of catalysts.

6. A process as claimed in claim 2, in which pyrolysis is carried out without compression in gaseous phase, in the absence of catalysts.

7. A process as claimed in claim 1, in which pyrolysis is carried out in the presence of a catalyst selected from the group consisting of hydrogenation catalysts and dehydrogenation catalysts.

8. A process as claimed in claim 2, in which pyrolysis is carried out in the presence of a catalyst selected from the group consisting of hydrogenation catalysts and dehydrogenation catalysts.

9. A process as claimed in claim 1, in which the indene homologs are passed in the gaseous phase in mixture with nitrogen, through the pyrolysis zone.

10. A process as claimed in claim 2, in which the mixture of indene homologs with hydrocarbons is passed in the gaseous phase in mixture with nitrogen, through the pyrolysis zone.

11. A process as claimed in claim 2, in which an oil fraction rich in aromatic compounds, having a boiling range of 180–250° C. and containing indene homologs, is subjected to pyrolysis.

12. A process as claimed in claim 11, in which the oil fraction has a boiling range of 205–235° C.

References Cited

UNITED STATES PATENTS 3,197,518   7/1965   Chapman et al. _____ 260—668 F

CURTIS R. DAVIS, Primary Examiner